United States Patent
Wu et al.

(10) Patent No.: US 11,723,110 B2
(45) Date of Patent: Aug. 8, 2023

(54) DISCONTINUOUS OPERATION ON SIDELINK

(71) Applicant: QUALCOMM INCORPORATED, San Diego, CA (US)

(72) Inventors: Shuanshuan Wu, San Diego, CA (US); Anantharaman Balasubramanian, San Diego, CA (US); Gabi Sarkis, San Diego, CA (US); Kapil Gulati, Belle Mead, NJ (US); Sudhir Kumar Baghel, Hillsborough, NJ (US); Shailesh Patil, San Diego, CA (US); Tien Viet Nguyen, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 368 days.

(21) Appl. No.: 17/148,198

(22) Filed: Jan. 13, 2021

(65) Prior Publication Data
US 2021/0243836 A1 Aug. 5, 2021

Related U.S. Application Data

(60) Provisional application No. 62/968,967, filed on Jan. 31, 2020.

(51) Int. Cl.
*H04W 52/02* (2009.01)
*H04W 76/28* (2018.01)
(Continued)

(52) U.S. Cl.
CPC ....... *H04W 76/28* (2018.02); *H04W 52/0216* (2013.01); *H04W 72/20* (2023.01);
(Continued)

(58) Field of Classification Search
None
See application file for complete search history.

(56) References Cited

U.S. PATENT DOCUMENTS

2020/0314928 A1* 10/2020 Kang ................ H04W 76/14
2020/0344722 A1* 10/2020 He .................... H04L 1/1819
(Continued)

FOREIGN PATENT DOCUMENTS

| EP | 2345299 A1 | 7/2011 |
| EP | 3136812 A1 | 3/2017 |

(Continued)

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 12)", 3GPP Draft; 36300-CA0, 3rd Generation Partnership Project (3GPP), Mobile Competence Centre; 650, Route Des Lucioles; F-06921 Sophia-Antipolis Cedex; France, Jun. 24, 2016 (Jun. 24, 2016), 254 Pages, XP051120046, . . . Retrieved from the Internet: URL: https://www.3gpp.org/ftp/tsg_ran/WG2_RL2/Specifications/201606_final_specs_after_RAN_72/ [retrieved on Jun. 24, 2016] p. 55 pp. 120-121 pp. 223,226.

(Continued)

*Primary Examiner* — Robert M Morlan
(74) *Attorney, Agent, or Firm* — Haynes and Boone, LLP

(57) ABSTRACT

Wireless communication systems and methods related to sidelink communications are provided. A first user equipment (UE) determines a discontinuous operation configuration that indicates an on-duration period for a sidelink communication and a cycle of discontinuous operation. The first UE communicates with at least one other UE during the on-duration period indicated by the discontinuous operation configuration. The first UE uses a base configuration and an (Continued)

on-duration parameter, an offset parameter, and a cycle parameter to determine a discontinuous operation configuration for the first UE.

30 Claims, 12 Drawing Sheets

(51) Int. Cl.
*H04W 80/02* (2009.01)
*H04W 72/20* (2023.01)
*H04W 92/18* (2009.01)
*H04W 88/04* (2009.01)

(52) U.S. Cl.
CPC ............ *H04W 80/02* (2013.01); *H04W 88/04* (2013.01); *H04W 92/18* (2013.01)

(56) References Cited

U.S. PATENT DOCUMENTS

| | | | |
|---|---|---|---|
| 2022/0353948 A1* | 11/2022 | Luo | H04W 76/28 |
| 2023/0043139 A1* | 2/2023 | Hwang | H04W 68/00 |

FOREIGN PATENT DOCUMENTS

| | | |
|---|---|---|
| WO | 2015169406 A1 | 11/2015 |
| WO | 2018064477 A1 | 4/2018 |

OTHER PUBLICATIONS

International Search Report and Written Opinion—PCT/US2021/013523—ISA/EPO—dated May 3, 2021.

* cited by examiner

DISCONTINUOUS OPERATION ON SIDELINK

CROSS-REFERENCE TO A RELATED APPLICATION

The present application claims priority to and benefit of the U.S. Provisional patent Application No. 62/968,967, filed Jan. 31, 2020, which is hereby incorporated by reference in its entirety.

TECHNICAL FIELD

This application relates to wireless communication systems, and more particularly to a discontinuous operation of user equipment over a sidelink.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology, which may be referred to as 5th Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

In addition to communicating via a BS, UEs can also communicate with each other directly over a sidelink. The resource allocation for sidelink communication may be autonomous because UEs, and not a BS, determine time and frequency resource(s) for data transmission from configured or preconfigured resource pool(s). Because UEs communicating over a sidelink do not have designated transmitting and receiving resources, the UEs either transmit information or continuously monitor for transmissions from other UEs. The sidelink communication mechanism discussed above may work well for UEs, such as vehicle UEs or V-UEs, that are not limited by power. However, this sidelink communication mechanism does not work well for UEs, such as pedestrian UEs (P-UEs) or battery powered UEs, that have limited power. The aspects below, describe a power saving mechanism that allows the UEs to intermittently communicate over a sidelink thus allowing the UEs to save power.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

The aspects are directed to a method of wireless communication, comprising accessing, at a first user equipment (UE), a base configuration for determining a discontinuous operation configuration for the first UE, and determining, by applying at least one parameter to the base configuration, the discontinuous operation configuration that indicates an on-duration period for a sidelink communication and a cycle of discontinuous operation.

The aspects of the disclosure are also directed to a method of wireless communication, comprising determining, at a first user equipment (UE), a discontinuous operation configuration, wherein the discontinuous operation configuration indicates an on-duration period for a sidelink communication, and a cycle of discontinuous operation, and communicating with at least one other UE during the on-duration period indicated by the discontinuous operation configuration.

The aspects of the disclosure are also directed to a method of wireless communication, comprising determining, at a first user equipment (UE) a discontinuous transmission (DTX) configuration for communicating over a sidelink, wherein the DTX configuration includes a DTX cycle with an on-duration period, transmitting the DTX configuration to a second UE over the sidelink, receiving a discontinuous reception (DRX) configuration that indicates an on-duration period and a DRX cycle of the second UE, wherein the on-duration period indicated by the DRX configuration is aligned with the on-duration period indicated by the DTX configuration, and transmitting data from the first UE to the second UE over the sidelink during the on-duration period of the DTX cycle to be received by the second UE during the on-duration period of an DRX cycle.

The aspects are also directed to a method of wireless communication, comprising, receiving, at a first user equipment (UE) and over a sidelink, a discontinuous transmission (DTX) configuration from a second UE, wherein the DTX configuration indicates an on-duration period and a DTX cycle, determining, at the first UE, a discontinuous reception (DRX) configuration that indicates an on-duration period and a DRX cycle during which the first UE receives data from the second UE, wherein the DRX configuration is based on the DTX configuration, and receiving over the sidelink, at the first UE, the data from the second UE during the on-duration period in the DRX cycle.

The aspects of the disclosure are also directed to a method of wireless communication, comprising receiving, at a first user equipment (UE) and over a sidelink, a discontinuous transmission (DTX) configuration from a second UE, wherein the DTX configuration indicates an on-duration period and a DTX cycle, determining, at the first UE, a discontinuous reception (DRX) configuration that indicates an on-duration period and a DRX cycle during which the first UE receives data from the second UE, wherein the DRX configuration is based on the DTX configuration, and receiving over the sidelink, at the first UE, the data from the second UE during the on-duration period in the DRX cycle.

The aspects of the disclosure are also directed to a method of wireless communication, comprising determining, at a first user equipment (UE), a discontinuous operation configuration for communicating over a sidelink, wherein the discontinuous operation configuration includes a discontinuous operation cycle with an on-duration period, transmitting the discontinuous operation configuration to a second UE over the sidelink, and communicating with the second UE during the on-duration period indicated by the discontinuous operation configuration.

Aspect 1: Aspects of the disclosure are directed to an apparatus, comprising a processor configured to access, at a first user equipment (UE), a base configuration for determining a discontinuous operation configuration for the first UE, and determine, by applying at least one parameter to the base configuration, the discontinuous operation configuration that indicates an on-duration period for a sidelink communication and a cycle of discontinuous operation.

Aspect 2: The disclosure of aspect 1, wherein the base configuration includes a discontinuous operation cycle base unit and a plurality of base units in the discontinuous operation cycle base unit.

Aspect 3: The disclosure of aspect 2, wherein the processor is further configured to determine the on-duration period in the discontinuous operation configuration using an on-duration parameter in the at least one parameter and at least one base unit in the plurality of base units of the base configuration.

Aspect 4: The disclosure of aspect 2, wherein the processor is further configured to determine an offset from a beginning of a cycle to the on-duration period in the discontinuous operation configuration using an offset parameter in the at least one parameter and at least one base unit in the plurality of base units of the base configuration.

Aspect 5: The disclosure of aspect 2, wherein the processor is further configured to determine a cycle in the discontinuous operation configuration using a cycle parameter in the at least one parameter and the discontinuous operation cycle base unit of the base configuration.

Aspect 6: The disclosure of any of aspects 1-2, wherein the processor is further configured to store a look-up table that includes a plurality of discontinuous operation configurations based on the base configuration and at least one of an on-duration parameter, an offset parameter, and a cycle parameter.

Aspect 7: The disclosure of any of aspects 1-2 and 6, wherein the discontinuous operation configuration is a discontinuous transmission (DTX) configuration that defines a DTX cycle.

Aspect 8: The disclosure of any of aspects 1-2 and 6-7, further comprising a transceiver in communication with the processor and configured to transmit data over a sidelink during the on-duration period in the DTX cycle.

Aspect 9: The disclosure of any of aspects 1-2 and 6-8, further comprising a transceiver in communication with the processor and configured to transmit the DTX configuration to a second UE over a sidelink, receive a discontinuous reception (DRX) configuration that indicates an on-duration period and a DRX cycle of the second UE, wherein the on-duration period indicated by the DRX configuration is aligned with the on-duration period indicated by the DTX configuration, and transmit data from the first UE to the second UE over the sidelink during the on-duration period of the DTX cycle to be received by the second UE during the on-duration period of an DRX cycle.

Aspect 10: The disclosure of any of aspects 1-2 and 6-9, wherein the discontinuous operation configuration is a discontinuous reception (DRX) configuration that defines a DRX cycle.

Aspect 11: The disclosure of any of aspects 1-2 and 6-10, further comprising a transceiver in communication with the processor and configured to receive data over a sidelink during the on-duration period in the DRX cycle.

Aspect 12: The disclosure of any of aspects 1-2 and 6-11, further comprising a transceiver in communication with the processor and configured to transmit the DRX configuration to a second UE over a sidelink, receive a DTX configuration that indicates an on-duration period and a DTX cycle of the second UE, wherein the on-duration period indicated by the DTX configuration is aligned with the on-duration period indicated by the DRX configuration, and receive data from the second UE over the sidelink during the on-duration period of the DRX cycle to be transmitted by the second UE during the on-duration period of a DTX cycle.

Aspect 13: The disclosure of any of aspects 1-2 and 6-12, further comprising a transceiver in communication with the processor and configured to transmit the discontinuous operation configuration over a sidelink control signaling.

Aspect 14: The disclosure of aspect 13, wherein the discontinuous operation configuration is transmitted using a sidelink control information (SCI) in the sidelink control signaling.

Aspect 15: The disclosure of any of aspects 1-2 and 6-12, wherein the discontinuous operation configuration is transmitted using a MAC control element.

Aspect 16: Aspect of the disclosure are directed to a method, comprising accessing, at a first user equipment (UE), a base configuration for determining a discontinuous operation configuration for the first UE, and determining, by applying at least one parameter to the base configuration, the discontinuous operation configuration that indicates an on-duration period for a sidelink communication and a cycle of discontinuous operation.

Aspect 17: The disclosure of aspect 16, wherein the base configuration includes a discontinuous operation cycle base unit and a plurality of base units in the discontinuous operation cycle base unit.

Aspect 18: The disclosure of aspect 17, further comprising determining the on-duration period in the discontinuous operation configuration using an on-duration parameter in the at least one parameter and at least one base unit in the plurality of base units of the base configuration.

Aspect 19: The disclosure of aspect 17, further comprising determining an offset from a beginning of a cycle to the on-duration period in the discontinuous operation configuration using an offset parameter in the at least one parameter and at least one base unit in the plurality of base units of the base configuration.

Aspect 20: The disclosure of aspect 17, further comprising determining a cycle in the discontinuous operation configuration using a cycle parameter in the at least one parameter and the discontinuous operation cycle base unit of the base configuration.

Aspect 21: The disclosure of any of aspects 16-17, further comprising, storing a look-up table that includes a plurality of discontinuous operation configurations based on the base configuration and at least one of an on-duration parameter, an offset parameter, and a cycle parameter.

Aspect 22: The disclosure of any of aspects 16-17 and 21, wherein the discontinuous operation configuration is a discontinuous transmission (DTX) configuration that defines a DTX cycle.

Aspect 23: The disclosure of any of aspects 16-17 and 21-22, further comprising transmitting data over a sidelink during the on-duration period in the DTX cycle.

Aspect 24: The disclosure of aspect 23, further comprising transmitting the DTX configuration to a second UE over a sidelink, receiving a discontinuous reception (DRX) configuration that indicates an on-duration period and a DRX cycle of the second UE, wherein the on-duration period indicated by the DRX configuration is aligned with the on-duration period indicated by the DTX configuration, and transmitting data from the first UE to the second UE over the sidelink during the on-duration period of the DTX cycle to be received by the second UE during the on-duration period of an DRX cycle.

Aspect 25: The disclosure of any of aspects 16-17 and 21-22, wherein the discontinuous operation configuration is a discontinuous reception (DRX) configuration that defines a DRX cycle.

Aspect 26: The disclosure of aspect 25, further comprising receiving data over a sidelink during the on-duration period in the DRX cycle.

Aspect 27: The disclosure of aspect 25, further comprising transmitting the DRX configuration to a second UE over a sidelink, receiving a DTX configuration that indicates an on-duration period and a DTX cycle of the second UE, wherein the on-duration period indicated by the DTX configuration is aligned with the on-duration period indicated by the DRX configuration, and receiving data from the second UE over the sidelink during the on-duration period of the DRX cycle to be transmitted by the second UE during the on-duration period of a DTX cycle.

Aspect 28: The disclosure of any of aspects 16-17 and 21-22, further comprising a transceiver in communication with the processor and configured to transmit the discontinuous operation configuration over a sidelink control signaling.

Aspect 29: Aspects of the disclosure are directed to a user equipment (UE), comprising means for accessing a base configuration for determining a discontinuous operation configuration for the first UE, and means for determining, by applying at least one parameter to the base configuration, the discontinuous operation configuration that indicates an on-duration period for a sidelink communication and a cycle of discontinuous operation.

Aspect 30: Aspects of the disclosure are directed to a non-transitory computer-readable medium having program code recorded thereon, the program code comprising code for accessing, at a first user equipment (UE), a base configuration for determining a discontinuous operation configuration for the first UE, and code for determining, by applying at least one parameter to the base configuration, the discontinuous operation configuration that indicates an on-duration period for a sidelink communication and a cycle of discontinuous operation.

DETAILED DESCRIPTION

Figure 1:
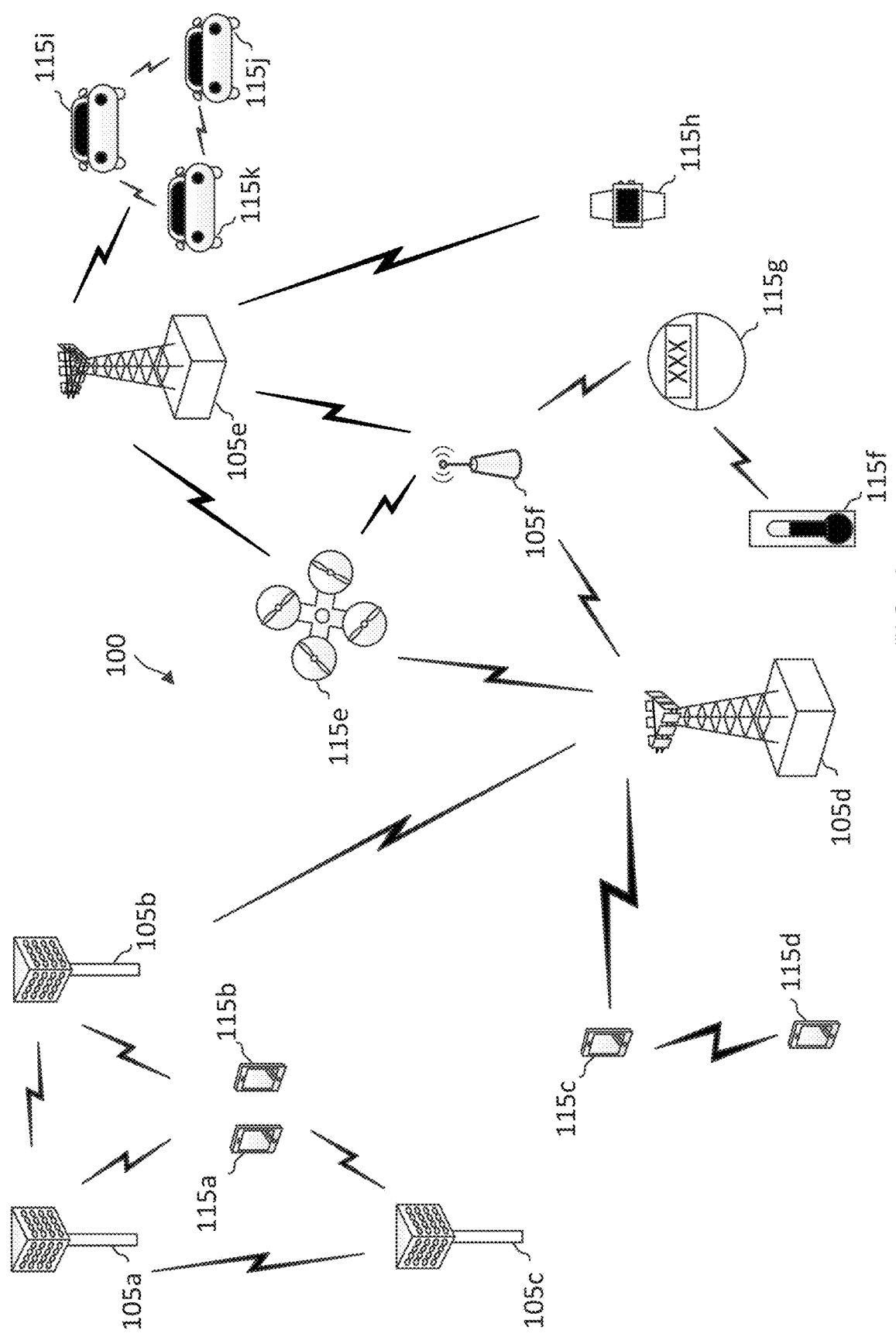
FIG. 1 illustrates a wireless communication network, according to aspects of the disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, 5th Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ULtra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The provisioning of sidelink services, such as device-to-device (D2D), vehicle-to-vehicle (V2V), vehicle-to-everything (V2X), cellular vehicle-to-everything (C-V2X), pedestrian device-to-vehicle (P2V) communications, over dedicated spectrum or licensed spectrum are relatively straight-forward as channel access in the dedicated spectrum or licensed spectrum is guaranteed. NR-U can bring benefit for sidelink services, for example, by offloading sidelink traffic to the unlicensed spectrum at no cost.

Some devices that use sidelink services are not concerned with power and the amount of power the devices use the sidelink communications. These devices transmit information over a sidelink and constantly monitor for transmissions from other devices. Other devices that use sidelink services are power limited devices, e.g. devices that are battery powered. These devices cannot constantly monitor for transmissions over a sidelink and maintain battery power. Accordingly, aspects below describe power conservation techniques that allow devices to intermittently communicate over a sidelink and thus save power.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 illustrates a wireless communication network 100 according to some aspects of the disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. The UEs 115a-115d are pedestrian UEs or P-UEs and tend to have limited power. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. The UEs 115i-115k tend to have power that is unlimited for the purposes of the disclosure. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-step-size configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as V2V, V2X, C-V2X, V2P, and P2P communications between a UE 115i, 115j, or 115k and other UEs 115, and/or vehicle-to-infrastructure (V2I) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant.

In some aspects, the network 100 may provision for sidelink services that allow a UE 115 to communicate with other UE(s) 115 without tunneling through a BS 105 and/or the core network. The BS 105 may configure certain resources in a licensed band and/or an unlicensed band for sidelink communications between the UEs 115. Certain frequency bands may have certain bandwidth occupancy requirements and/or a maximum allowable power spectral density (PSD). To meet bandwidth occupancy requirements and/or boost transmit power under certain PSD limitations, sidelink transmissions in the network 100 may use a frequency-interlaced waveform. For example, an unlicensed band may be partitioned into a plurality of frequency interlaces and sidelink communications can be transmitted over one or more frequency interlaces.

As discussed above, sidelink communications may be between two or more UEs 115 and may be V2X, V2V, V2P, P2P, V2I, D2D and DSRC communications. Some sidelink communications, such as V2X, V2V, V2I, D2D and DSRC communications may involve UEs 115 that is not power sensitive and may continuously transmit communications to other UEs 115 or continuously listen to communications from other UEs 115. Other sidelink communications, such as V2P and P2P communications involve a pedestrian UE (P-UE) that is power sensitive and cannot afford to be active all the time for receiving transmissions from other UEs 115. To conserver power, the UE 115 may include a power saving mechanism. The power saving mechanism provides for discontinuous operations, such as a discontinuous transmission (DTX) and discontinuous reception (RTX) of data over a sidelink. In this way, the UE 115 may intermittently transmit or receive data and ultimately save power.

Resource allocation for UEs 115 communicating over a sidelink may be autonomous. This is because the BS 105 in network 100 may not be involved in scheduling resources for sidelink communications. Instead, UEs 115 may allocate resources for transmission over a sidelink and may allocate resources that listen to the transmissions from other UEs 115. Thus, when UE 115 is not transmitting, UE 115 may be attempting to decode the control information in every slot in the channel or subchannel to determine if other UEs 115 are transmitting information. As discussed above, this mechanism may work well for UEs 115 that are not power sensitive, such as vehicle UEs. However, this mechanism may not work well for power sensitive UEs 115, such as pedestrian UEs 115. Because pedestrian UEs 115 have limited power, these UEs 115 cannot afford to continuously monitor for transmissions from other UEs 115. To conserver power, the power sensitive UEs 115 may configure discontinuous operations, such as a transmission (DTX) and discontinuous reception (DRX). The discontinuous operations allow the UE 115 to intermittently communicate with other UEs 115 over a sidelink.

In some aspects, discontinuous operations may be determined from a discontinuous operation configuration. The discontinuous operation configuration may be a DTX configuration or a DRX configuration or may be used to determine both DTX and DRX configuration. The discontinuous operation configuration may be determined from a base configuration that are configured or preconfigured on the UE 115. For example, the UE 115 may receive the base configuration from BS 105 or a base configuration may be preconfigured in hardware or in a SIM card of the UE 115. Alternatively, the UE 115 may also be downloaded when UE 115 is initially activated. The UEs 115 that communicate over a sidelink in network 100 may use the same base configuration(s) to determine discontinuous operations.

Figure 2:
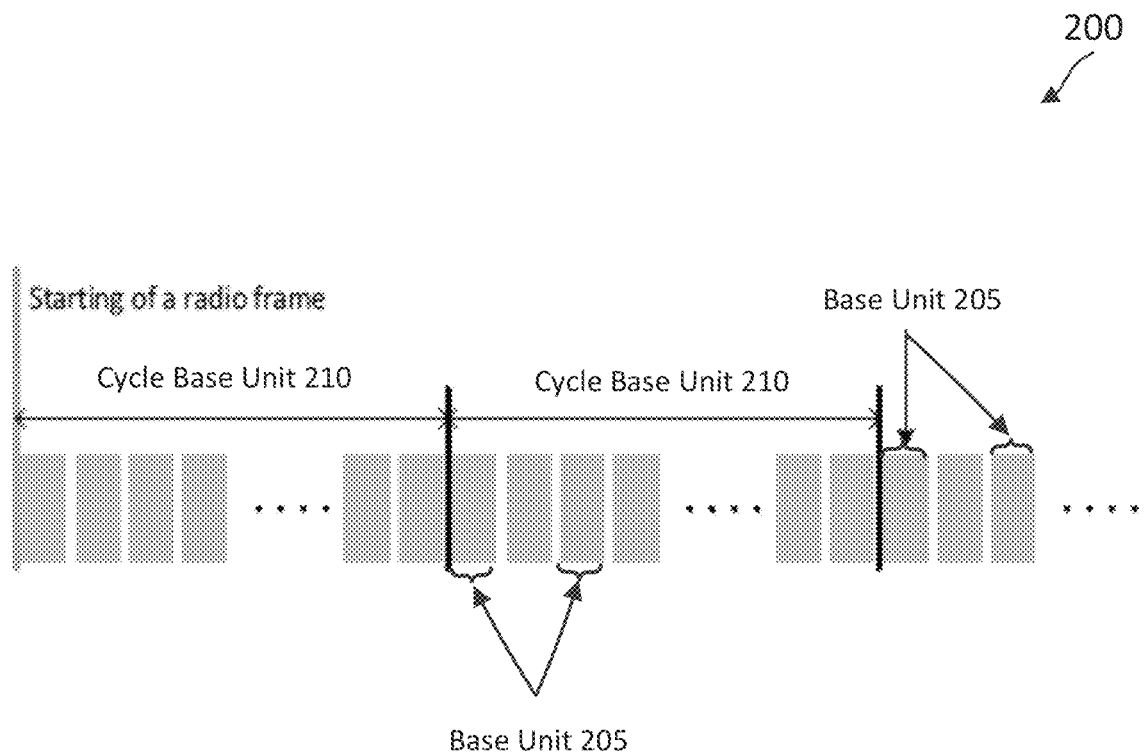
FIG. 2 is a block diagram of a base configuration, according to aspects of the disclosure

FIG. 2 is a block diagram of a base configuration 200, according to some aspects of the disclosure. As illustrated in FIG. 2, base configuration may include one or more base units 205 and cycle base unit 210. Each base unit 205 includes resources in the resource pool that UE 115 may use to transmit information, e.g. data or control information over a sidelink to other UE(s) 115. Each base unit 205 may be measured using a time measurement, such as milliseconds (ms). A cycle base unit 210 may include a configurable number of base units 205. Cycle base unit 210 typically includes the same number of base units 205 as other cycle base units 210.

In some aspects, UE 115 may use the base configuration 200 to define a discontinuous operation configuration, such as the DTX or DRX configuration, that is specific to the UE 115. The discontinuous operation configuration may have an on-duration and off-duration periods. For example, the DTX configuration may have an on-duration period and an off-duration period, and DRX configuration may also have an on-duration period and an off-duration period. The discontinuous operation configuration may be based on the cycle base unit 210 and the on-duration and off-duration periods may be based on one or more base units 205 in the base configuration 200. During the on-duration period the UE 115 may communicate with one or more other UE 115 over a sidelink. During the off-duration period, UE 115 may enter a sleep mode and not transmit or receive communications from other UEs 115. For example, during the on-duration period specified in the DTX configuration the UE 115 may transmit data or control information to other UE(s) 115. Similarly, during the on-duration interval specified in the DRX configuration, the UE 115 may receive data or control information from other UE(s) 115.

Figure 3A:
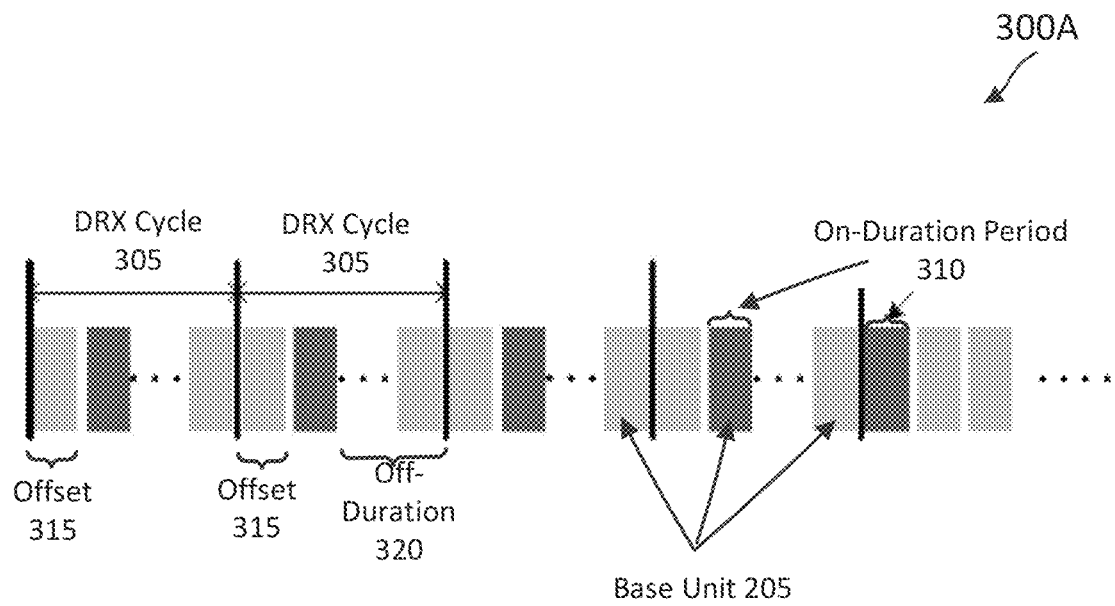
FIGS. 3A-3D are diagrams of discontinuous operation configurations according to aspects of the disclosure.
Figure 3B:
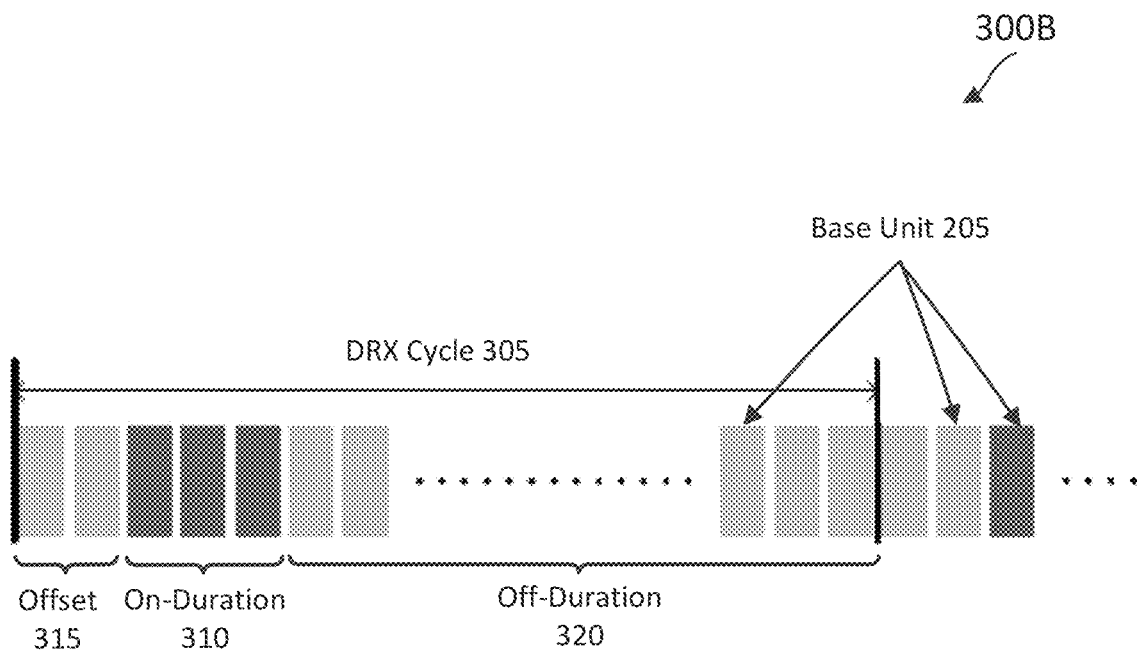
Figure 3C:
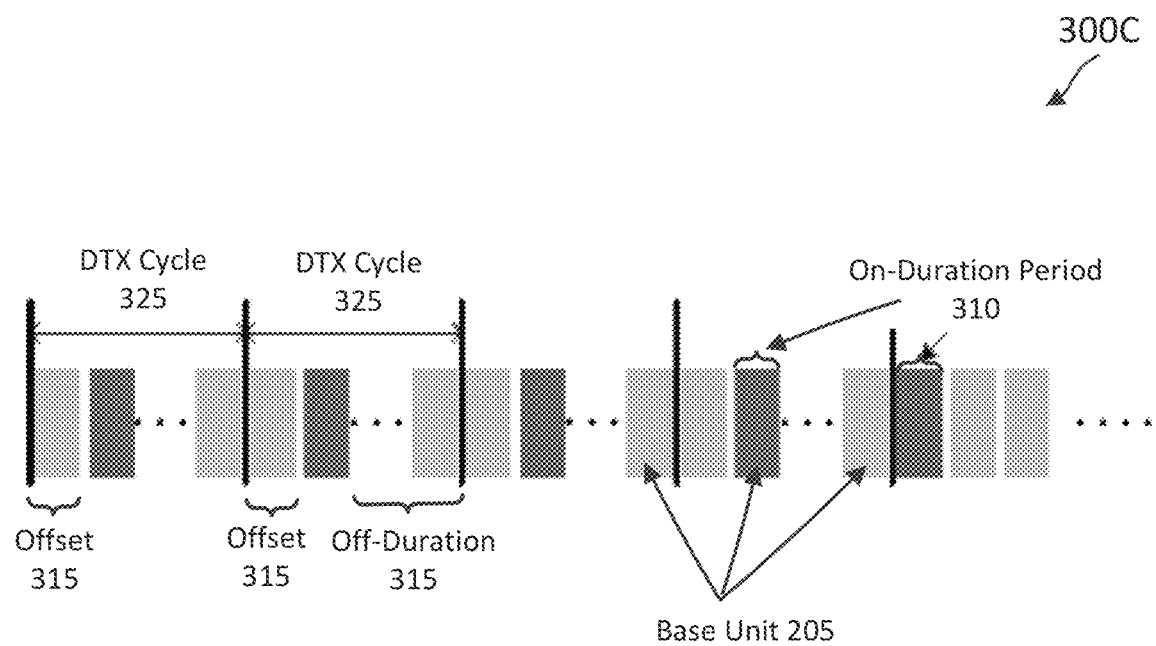
Figure 3D:
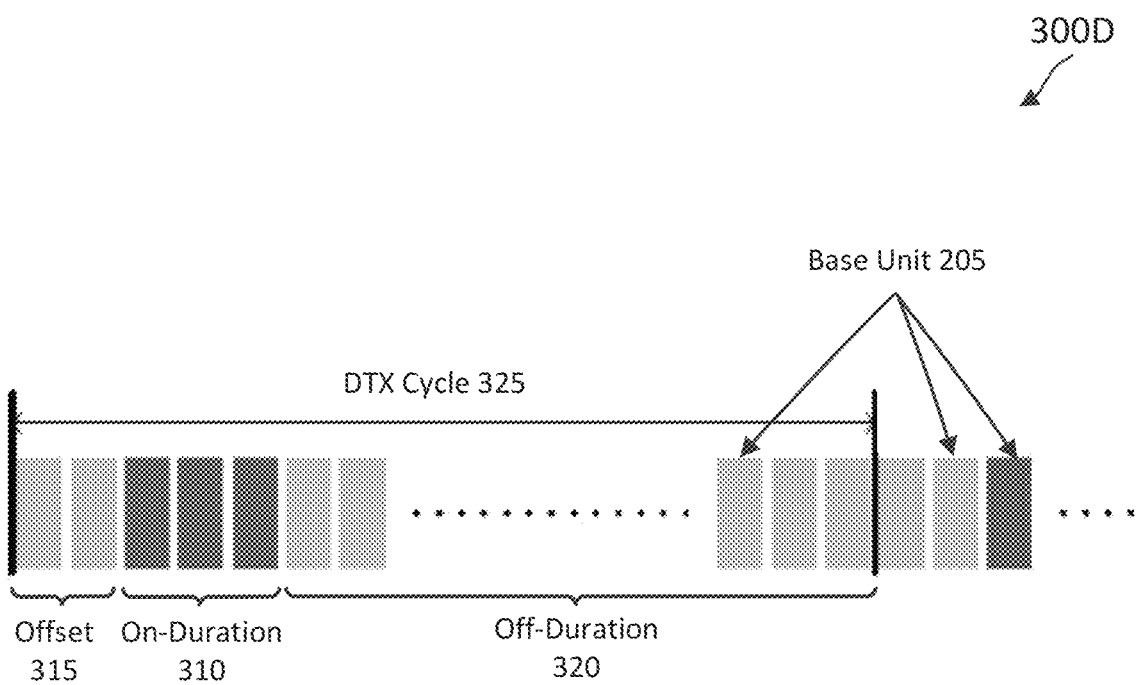

FIGS. 3A-3D are block diagrams of discontinuous operation configurations 300 according to aspects of the disclosure. FIGS. 3A and 3B are block diagrams of the DRX configurations 300A and 300B, and FIGS. 3C and 3D are block diagrams of the DTX configurations 300C and 300D. Notably, the discontinuous operation configurations 300 in FIGS. 3A-D are for illustrative purposes only and there may be other aspects of the discontinuous operation configurations.

As illustrated in FIGS. 3A and 3B, the UE 115 may define the DRX configurations 300A-B using the base configuration 200. For example, the DRX configuration 300A may include one or more DRX cycles 305. Typically, the DRX cycles 305 may have the same number of cycle base units 210. The example cycle base unit 210 for the purposes of the examples below is 640 ms. The DRX cycle 305 may be based on a cycle parameter that is a fraction or a multiple of the cycle base unit 210. Example cycle parameters may be one of {⅛, ¼, ½, 1, 2, 4, 8, 16}. When the cycle parameters are applied to the cycle base unit 210, the possible sizes for the DRX cycle 305 may be 80 ms, 160 ms, 320 ms, 640 ms, 1280 ms, 2560 ms, 5120 ms, and 10240 ms. Because of the various possible cycle parameters, the DRX cycle may be different for different UEs 115.

In some aspects, the DRX cycle 305 may include an on-duration period 310. During the on-duration period 310, the UE 115 may monitor carriers for transmissions from other UEs 115. The on-duration period 310 may be determined using base units 205 and may have possible sizes that include one or more base units 205. FIG. 3A illustrates an on-duration period 310 that is one base unit 205. The on-duration period 310 may be determined using an on-duration parameter and the base unit 205. For example, suppose base unit 205 is 10 ms, DRX cycle 305 is 640 ms and the on-duration parameter is {1, 2, 3 . . . 64}. Then the on-duration period 310 may be 10 ms, 20 ms, . . . 640 ms. Because of the various possible on-duration parameters, the on-duration period 310 may be different for different DRX cycles 305. Thus, different UEs 115 may have different on-duration periods 310.

As discussed above, the UE 115 may transmit information during the on-duration period 310 using one or more resources allocated for the transmission. For example, if the on-duration period 310 is a single base unit 205, the UE 115 may transmit using the resources using the single base unit 205. In another example, if the on-duration period 310 is a two base unit 205, the UE 115 may transmit data using the first base unit 205, the second base unit 205, or the first and second base units 205.

In some aspects, the DRX cycle 305 may include an offset 315. The offset 315 determines a location of the on-duration period 310 within the DRX cycle 305. The offset 315 may be one or more base units 205 from the beginning of the DRX cycle 305 and up to the length of the DRX cycle 305. The offset 315 may be determined using an offset parameter multiplied by the base unit 205. For example, suppose offset parameter={0, 1, 2, 3, . . . 63} then the offset 315 may be 0 ms, 10 ms, 20 ms, . . . , 640 ms when the DRX cycle 305 is 640 ms and base unit 205 is 10 ms. FIG. 3A illustrates an offset 315 that is one base unit 205. Because of the various possible offsets 315 the location of the on-duration period 310 in the DRX cycle 305 may be different for different UEs 115.

In some aspects, the DRX cycle 305 also has an off-duration period 320. The off-duration period is a period of time in the DRX cycle 305 when UE 115 is not transmitting or receiving over the sidelink. In other words, the off-duration period 320 is a period of time in the DRX cycle 305 that is not the on-duration period 310.

FIG. 3B is another diagram of a DRX configuration 300B, according to aspects of the disclosure. In FIG. 3B, the cycle parameter is two, thus the DRX cycle 305 is twice the size of the cycle base unit 210. Also, the offset parameter is two, thus the offset 315 is two base units 205, and the on-duration parameter is three, thus the on-duration period 310 is three base units 205.

FIGS. 3C and 3D describe DTX configurations 300C and 300D that have the same parameters as DRX configurations 300A and 300B. As illustrated in FIG. 3C, the DTX configuration 300C includes a DTX cycle 325, on-duration period 310, and offset 315. The DTX cycle 325 is determined using the cycle parameter=½, thus the DTX cycle 325 is half of the cycle base unit 210. Offset 315 is determined using the offset parameter=1, thus the offset 315 is one base unit 205 from the beginning of the DTX cycle 325. The on-duration period 310 is determined using the on-duration parameter=1, thus the on-duration period 310 is one base unit 205.

As illustrated in FIG. 3D, the DTX configurations 300D includes the DTX cycle 325 that is determined using the cycle parameter=2 and the cycle base unit 210. Thus, the DTX cycle 235 is two cycle base units 210. The offset 315 is determined using an offset parameter=2 and base unit 205. Thus, the offset 315 is two base units 205. The on-duration period 310 is determined using on-duration parameter=3 and base unit 205. Thus, the on-duration period 310 is three base units 205.

As illustrated in FIGS. 3A-3D, the UEs 115 may use the discontinuous operation configuration 200 for determining cycles DTX and DRX configurations 300A-D that are used in the transmitting and receiving operations over a sidelink. When the UE 115 uses the discontinuous operation configuration, the UE 115 is active for transmitting and receiving during the on-duration period 310 determined from the discontinuous operation configuration.

Once the UE 115 determines the discontinuous operation configurations 300, e.g. DRX configurations 300A-B and DTX configurations 300C-D, based on the base configuration 200, the UE 115 may use the DRX cycle 305 and DTX cycle 325 indicated in the DRX and DTX configurations 300A-D to communicate with other UE(s) 115. More specifically, the UE 115 may communicate to other UEs 115 during the on-duration period 310.

The UE 115 may also transmit the DRX configuration 300A or 300B and DTX configuration 300C or 300D to other UE(s) 115 using sidelink control signaling. In some aspects, the DRX configuration 300A or 300B and the DTX configuration 300C or 300D may be transmitted over a sidelink using the signal control information (SCI) or the MAC control element (MAC-CE). For example, the sidelink control signaling may include one or more parameters, e.g. the cycle parameter, the on-duration parameter, the offset parameter, and the parameter identifying a discontinuous operation configuration as a DTX or DRX configuration. The parameters may be inserted into a SCI or MAC-CE. Further, each parameter may have a predefined bit length. For example, a parameter identifying whether the discontinuous operation configuration 300 is a DRX configuration 300A-B or a DTX configuration 300C-D may be one bit. The offset parameter may be six bits. The on-duration parameter may be six bits. The cycle parameter may be three bits.

There are a number of benefits for using the base configuration 200 to determine discontinuous operation configuration. First, the signaling overhead is low. This is because the UEs 115 in network 100 may already be preconfigured with the base configuration 200. As such, the UE 115 may use the sidelink control signaling to communicate the discontinuous operation configuration parameters to other UE(s) 115, and not the entire DRX configuration 300A-B and DTX configuration 300C-D. Once the other UE(s) 115 receive the parameters, the other UE(s) 115 may determine the DRX configuration 300A-B and DTX configuration 300C-D and the corresponding DRX cycle 305 and DTX cycle 325 from the parameters. Second, because the sidelink communication between the UEs 115 are autonomous, the BS 105 does not allocate resources for communication over sidelinks. This means that UEs 115 that communicate over sidelinks are not aligned and do not know when the other UEs 115 may communicate information. Because the DRX configuration 300A-B and DTX configuration 300C-D that the UE 115 sends to other UE(s) 115 include the on-duration periods 310 of the UE 115, the other UE(s) 115 may use the DRX configuration 300A-B and DTX configuration 300C-D of the UE 115 to identify when the UE 115 is transmitting and receiving information.

In some aspects, the UE 115 may use the DTX or DRX configurations 300A-D for unicast communications (between two UEs 115), connection-based or not connection-based groupcast communications (between a group of UEs 115) or broadcast communication (between multiple unconnected UEs 115) over a sidelink. In the connection-based communication, such as a unicast or connection based groupcast communications, the UEs 115 may negotiate an on-duration period 310. For example, in a unicast communication, two UEs 115 may determine the DTX and DRX configurations based on the base configuration 200 and then align the on-duration periods 310 in the DTX and DRX configurations. For example, a first UE 115 may determine the DTX configuration 300C and transmit the sidelink control signaling that includes the parameters associated with the DTX configuration 300C to the second UE 115. When the second UE 115 receives the DTX configuration 300C, the second UE 115 may align itself with the first UE 115 by generating the DRX configuration 300A that is a mirror of the DTX configuration 300C. In this way, the DRX cycle 305 indicated by the DRX configuration 300A and the DTX cycle 325 indicated by the DTX configuration 300C have on-duration periods 310 that occur at the same time. Thus, the first UE 115 may transmit data during the on-duration period 310 in the DTX cycle 325 while the second UE 115 may receive the data during the same on-duration period 310 in the DRX cycle 305.

In a connection based groupcast communication, a group of UEs 115 communicates with each other over a sidelink connection. Similarly to the unicast communication, in a groupcast communication, the UEs 115 in the group may negotiate the on-duration period 310 using DTX and DRX configurations that are based on the base configuration 200. For example, suppose a group of UEs 115 includes a first UE 115, a second UE 115, and a third UE 115. The first UE 115 can use the base configuration 200 to determine the DTX configuration 300C and transmit the parameters the define the DTX configuration 300C over sidelink control signaling to the second and third UEs 115. In response, the second and third UEs 115 may or may not define the DRX configuration 300A that mirrors the DTX configuration 300C. For example, if the second UE 115 is a pedestrian UE with limited power, the second UE 115 may define the DRX configuration 300A that mirrors the DTX configuration 300C. In this way, the on-duration period 310 associated with the DTX cycle 325 defined by the DTX configuration 300C has the same on-duration period 310 that is associated with the DRX cycle 305 defined by the DRX configuration 300A. The third UE 115 may be a vehicle UE. As discussed above, the vehicle UE may not have power limitations and may not need to define the DRX configuration 300A to save power. In this case, the third UE 115 may continuously listen for information transmitted from the first UE 115 over the sidelink. Thus, when the first UE 115 transmits data during the on-duration period 310 associated with the DTX configuration 300C, the second UE 115 receives the information during the on-duration period 310 associated with the DRX configuration 300A and the third UE 115 receives the information because the third UE 15 is constantly listening for information from the first UE 115.

In a broadcast transmission or a connectionless groupcast transmission, the broadcasting UE 115 may determine the DTX configuration 300D and the DRX configuration 300B. The UE 115 may then inform other UEs 115 that receive the broadcast of the DTX configuration 300D and the DRX configuration 300B, and the corresponding on-duration periods 310 and off-duration periods 320. For example, a broadcasting UE 115 may define the DTX configuration 300D using the base configuration 200. The broadcasting UE 115 may then broadcast the parameters for the DTX configuration 300D using sidelink control signaling to indicate to other UEs 115 the on-duration period 310 when the broadcasting UE 115 is transmitting data. The broadcasting UE 115 also defines the DRX configuration 300B that identifies the on-duration period 310 when the broadcasting UE 115 is listening for transmissions from other UEs 115. The broadcasting UE 115 then transmits the DRX configuration 300B using the sidelink control signaling. In this way, the broadcasting UE 115 announces both the DTX configuration 300D and the DRX configuration 300B to other UEs 115. The sidelink control signaling may be transmitted during the on-duration period 310 specified in the DTX configuration 300D. The other UEs 115 may then use the DTX configuration 300D and the DRX configuration 300B to determine when the broadcasting UE 115 transmits and receives information over a sidelink.

In some instances, the parameters for DRX and DTX configurations may be encoded in memory of the UE 115, e.g. in a look-up table. The look-up table may include different combinations of the cycle parameter, offset parameter and the on-duration parameter that may be applied to the base configuration 200. Further, the DTX or DRX configurations may be accessible using a corresponding index. In this way, the UE 115 may select the DTX or DRX configuration with the preconfigured parameters by selecting a corresponding index. In some aspects, if the UEs 115 in network 100 are preconfigured with the look-up table that stores the DTX or DRX configurations, the UE may transmit the index that corresponds to the DTX or DRX configuration in the sidelink control signaling instead of the parameters, thus further reducing the signaling overhead. The UE 115 that receives the index may then use the index to select the parameters for the DTX or DRX configuration in its look-up table.

Figure 4:
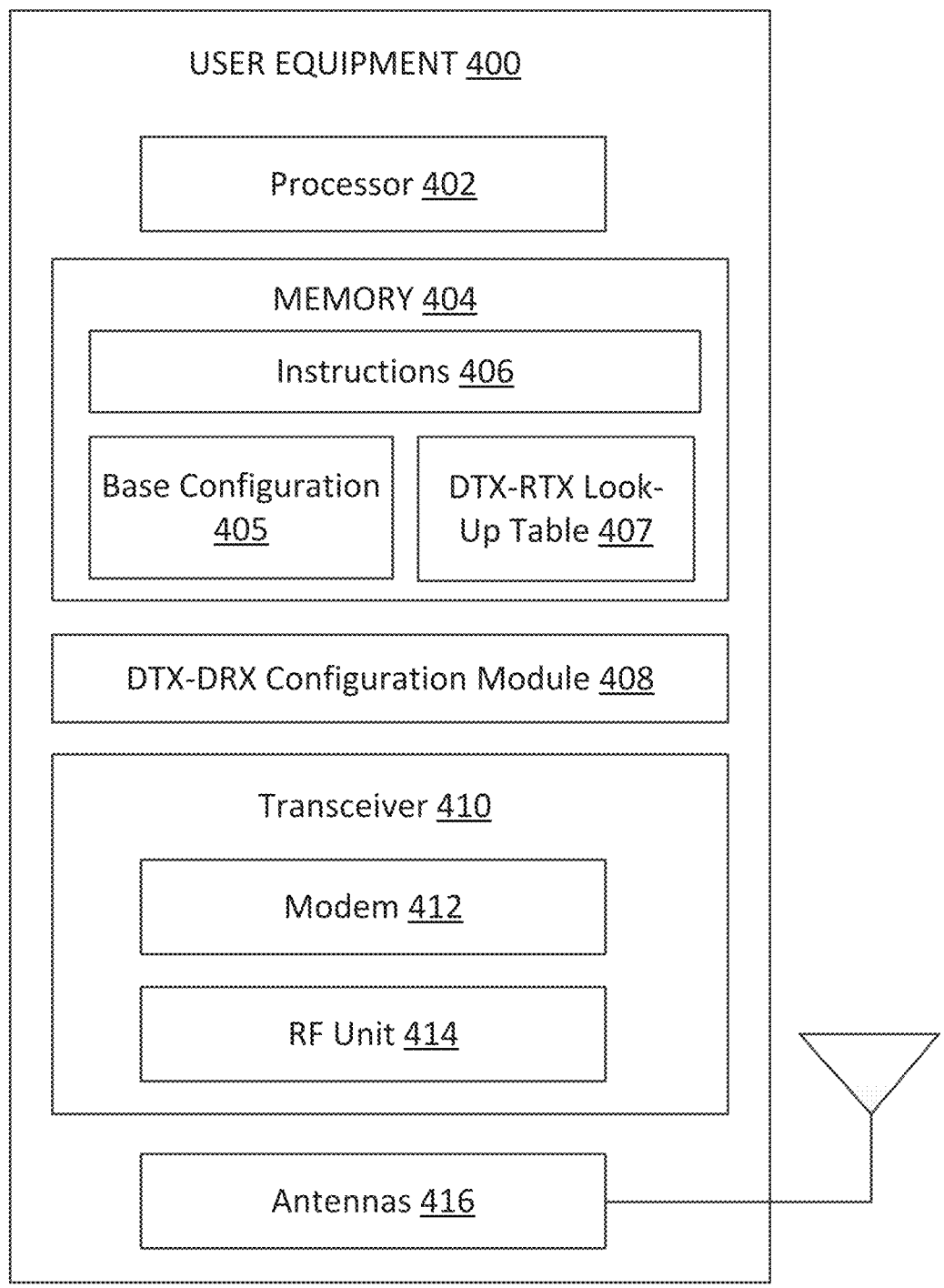
FIG. 4 is a block diagram of an exemplary user equipment (UE) according to embodiments of the present disclosure.

FIG. 4 is a block diagram of an exemplary UE 400 according to embodiments of the present disclosure. The UE 400 may be a pedestrian UE 115 as discussed above. As shown, the UE 400 may include a processor 402, a memory 404, DTX-DRX configuration module 408, a transceiver 410 including a modem subsystem 412 and a radio frequency (RF) unit 414, and one or more antennas 416. These elements may be in direct or indirect communication with each other, for example via one or more buses.

The processor 402 may include a central processing unit (CPU), a digital signal processor (DSP), an application-specific integrated circuit (ASIC), a controller, a field programmable gate array (FPGA) device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In some aspects, the memory 404 includes a non-transitory computer-readable medium. The memory 404 may store instructions 406. The instructions 406 may include instructions that, when executed by the processor 402, cause the processor 402 to perform the operations described herein with reference to the UEs 400 in connection with embodiments of the present disclosure. Instructions 406 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements. Memory 404 may also store base configuration 405, DTX-DRX look-up table, DTX-DRX configuration module 408.

The base configuration 405 may be the base configuration 200 that is configured or preconfigured in memory 404 of the UE 400. The base configuration may include a base unit and a cycle base unit that may be combined with one or more parameters, such as a cycle parameter, an offset parameter, and an on-duration parameter to determine discontinuous operation configurations for DRX and DTX communications.

The DTX-DRX configuration module 408 may determine the discontinuous operation configurations, such as the DRX configurations 300A-B and DTX configurations 300C-D from the base configuration and one or more parameters. The DRX configurations 300A-B and DTX configurations 300C-D may indicate the DRX or DTX cycle and an on-duration period in the DRX or DTX cycle when the UE 400 may communicate with other UE(s) 400. Because the parameters may have different values, the UE 400 may use the parameters to determine multiple discontinuous operation configurations.

The DTX-DRX look-up table may store different parameters that may be used to determine different discontinuous operation configurations, such as DRX configurations 300A-B and DTX configurations 300C-D. The UE 115 may use the DTX-DRX configuration module 408 to generate various discontinuous operation configurations and insert the discontinuous operation configurations into the DTX-DRX look-up table. The discontinuous operation configurations may be associated with an index. In this case, the DTX-DRX configuration module 408 may use an index to select one of the discontinuous operation configurations.

As shown, the transceiver 410 may include the modem subsystem 412 and the RF unit 414. The transceiver 410 can be configured to communicate bi-directionally with other devices, such as the BSs 105 or with other UEs 400. The modem subsystem 412 may be configured to modulate and/or encode the data from the memory 404 and/or DTX-DRX configuration module 408 according to a modulation and coding scheme (MCS), e.g., a low-density parity check (LDPC) coding scheme, a turbo coding scheme, a convolutional coding scheme, a digital beamforming scheme, etc. The RF unit 414 may be configured to process (e.g., perform analog to digital conversion or digital to analog conversion, etc.) modulated/encoded data from the modem subsystem 412 (on outbound transmissions) or of transmissions originating from another source such as a UE 115 or a BS 105. The RF unit 414 may be further configured to perform analog beamforming in conjunction with the digital beamforming. Although shown as integrated together in transceiver 410, the modem subsystem 412 and the RF unit 414 may be separate devices that are coupled together at the UE 400 to enable the UE 400 to communicate with other devices.

The RF unit 414 may provide the modulated and/or processed data, e.g. data packets (or, more generally, data messages that may contain one or more data packets and other information), to the antennas 416 for transmission to one or more other devices. This may include, for example, transmission of link switch indication and buffer status reports (BSRs) according to embodiments of the present disclosure. The antennas 416 may further receive data messages transmitted from other devices or UEs 400 over sidelinks. The antennas 416 may provide the received data messages for processing and/or demodulation at the transceiver 410. The antennas 416 may include multiple antennas of similar or different designs in order to sustain multiple transmission links. The RF unit 414 may configure the antennas 416.

Figure 5:
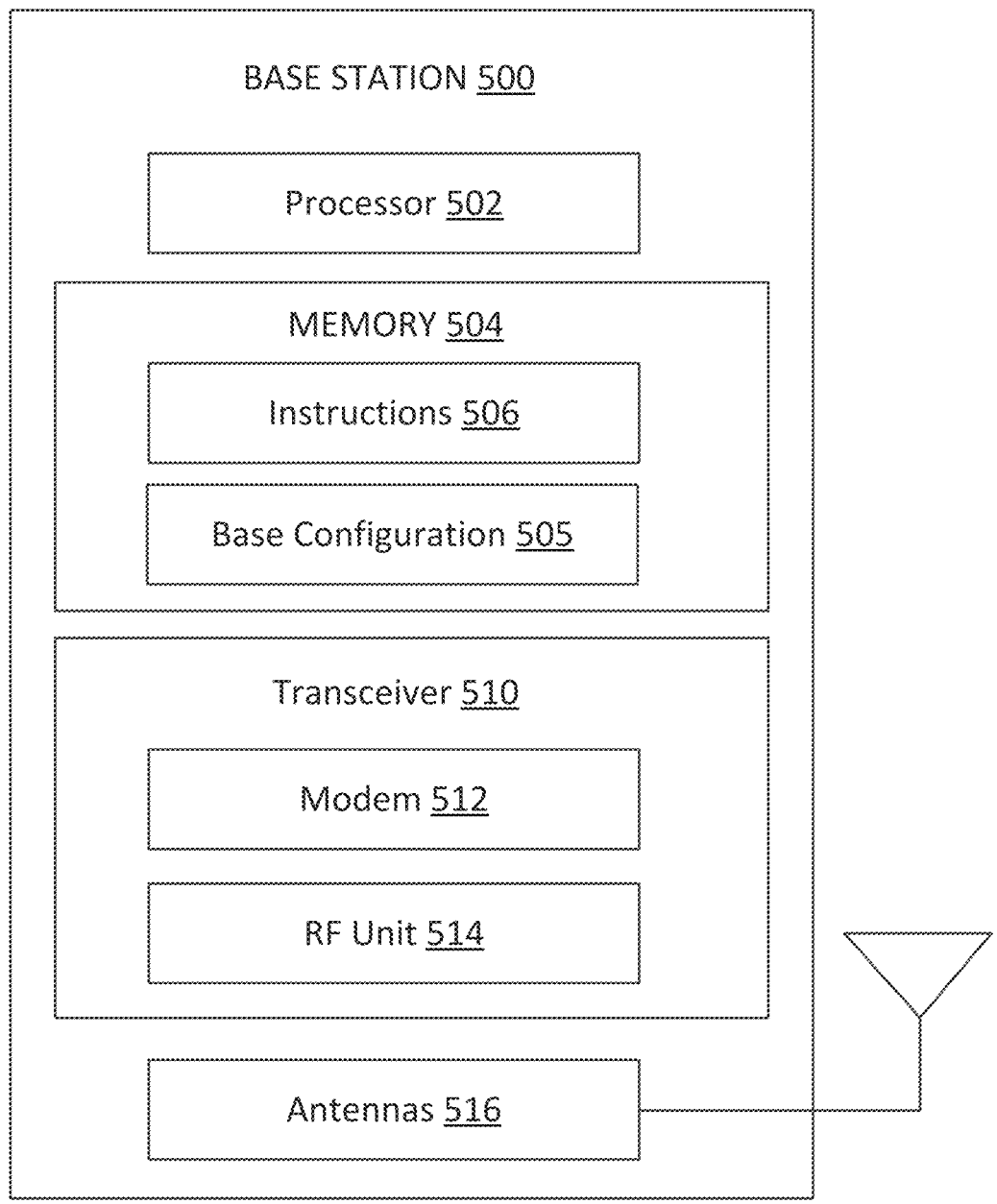
FIG. 5 is a block diagram of an exemplary base station (BS) according to embodiments of the present disclosure.

FIG. 5 is a block diagram of an exemplary BS 500 according to embodiments of the present disclosure. The BS 500 may be a BS 105 as discussed above. A shown, the BS 500 may include a processor 502, a memory 504, a transceiver 510 including a modem subsystem 512 and a RF unit 514, and one or more antennas 516. These elements may be in direct or indirect communication with each other, for example via one or more buses.

The processor 502 may have various features as a specific-type processor. For example, these may include a CPU, a DSP, an ASIC, a controller, a FPGA device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 504 may include a non-transitory computer-readable medium. The memory 504 may store instructions 506. The instructions 506 may include instructions that, when executed by the processor 502, cause the processor 502 to perform operations described herein. Instructions 506 may also be referred to as code, which may be interpreted broadly to include any type of computer-readable statement(s) as discussed above with respect to FIG. 5.

The memory 504 may also include a base configuration 505. The base configuration 505 may be the base configuration 200 that is configured or preconfigured in memory 504 of the BS 500 and may include a base unit and a cycle base unit that may be combined with one or more parameters, such as a cycle parameter, an offset parameter, and an on-duration parameter to determine discontinuous operation configurations.

As shown, the transceiver 510 may include the modem subsystem 512 and the RF unit 514. The transceiver 510 can be configured to communicate bi-directionally with other devices, such as the UEs 206 and/or another core network element. The modem subsystem 512 may be configured to modulate and/or encode data according to a MCS, e.g., a LDPC coding scheme, a turbo coding scheme, a convolutional coding scheme, a digital beamforming scheme, etc. The RF unit 514 may be configured to process (e.g., perform analog to digital conversion or digital to analog conversion, etc.) modulated/encoded data from the modem subsystem 512 (on outbound transmissions) or of transmissions originating from another source such as a UE 115. The RF unit 514 may be further configured to perform analog beamforming in conjunction with the digital beamforming. Although shown as integrated together in transceiver 510, the modem subsystem 512 and the RF unit 514 may be separate devices that are coupled together at the BS 105 to enable the BS 105 to communicate with other devices.

The RF unit 514 may provide the modulated and/or processed data, e.g. data packets (or, more generally, data messages that may contain one or more data packets and other information), to the antennas 516 for transmission to one or more other devices. This may include, for example, transmission of information to complete attachment to a network and communication with a camped UE 115 according to embodiments of the present disclosure. The antennas 516 may further receive data messages transmitted from other devices and provide the received data messages for processing and/or demodulation at the transceiver 510. The antennas 516 may include multiple antennas of similar or different designs in order to sustain multiple transmission links.

Figure 6:
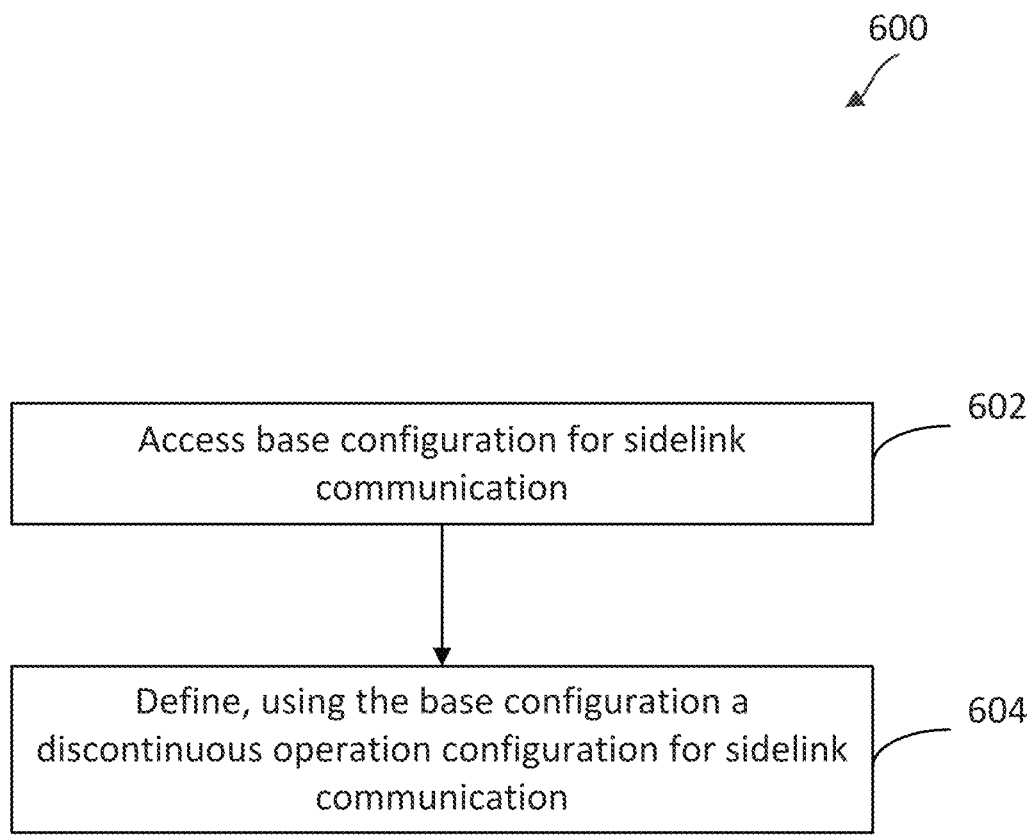
FIGS. 6-9 are flow diagrams of communication methods according to some aspects of the disclosure.

FIG. 6 is a flow diagram of a method 600 according to some aspects of the present disclosure. Steps of the method 600 can be executed by a computing device (e.g., a processor, processing circuit, and/or other suitable component) of a wireless communication device or other suitable means for performing the steps. For example, a wireless communication device, such as the UE 115, 400 may utilize one or more components, such as the processor 402, the memory 404, the DTX-DRX configuration module 408, the transceiver 410, the modem 412, and the one or more antennas 416, to execute the steps of method 600. As illustrated, the method 600 includes a number of enumerated steps, but aspects of the method 600 may include additional steps before, after, and in between the enumerated steps. In some aspects, one or more of the enumerated steps may be omitted or performed in a different order.

At step 602, a base configuration is accessed. For example, UE 115, 400 is preconfigured with base configuration 200 that determines discontinuous operation configuration 300 for sidelink communication. The base configuration 200 may include the cycle base unit 210 and base unit 205. The cycle base unit 210 may include multiple base units 205 that may be used to configure the on-duration period 310 and off-duration period 320 in the discontinuous operation cycle. The discontinuous operation configuration 300 may be the DRX configuration 300A-B that UE 115, 400 uses to generate a DRX cycle 305 or DTX configuration 300C-D that UE 115, 400 uses to generate the DTX cycle 325. The UE 115, 400 communicates with other UEs 400 during the on-duration periods 310 in the DRX cycle 305 and DTX cycle 325.

At step 604, the discontinuous operation configuration is defined. For example, UE 115, 400 may define the discontinuous operation configuration 300, e.g. DRX configuration 300A-B or DTX configuration 300C-D from the base configuration 200 and one or more parameters. The discontinuous operation configuration 300 includes a cycle of discontinuous operation with an on-duration period 310 and an off-duration period 320. Example parameters may include a cycle parameter, an on-duration parameter, and an offset parameter. The UE 115, 400 may use the cycle parameter and the cycle base unit 210 to determine the DRX cycle 305 for the DRX configuration 300A-B or the DTX cycle 325 for the DTX configuration 300C-D. The UE 115, 400 may use the on-duration parameter and base unit 205 to determine the on-duration period 310. The UE 115, 400 may use the offset parameter and base unit 205 in the base configuration 200 to determine an offset 315. The offset 315 identifies the location of the on-duration period 310 with respect to the beginning of the DTX cycle 325 or DRX cycle 305. As discussed above, the UE 115, 400 may define the DTX and DRX configurations 300A-D to intermittently transmit and receive data and control information over a sidelink and thus save power for the UE 115, 400.

Figure 7:
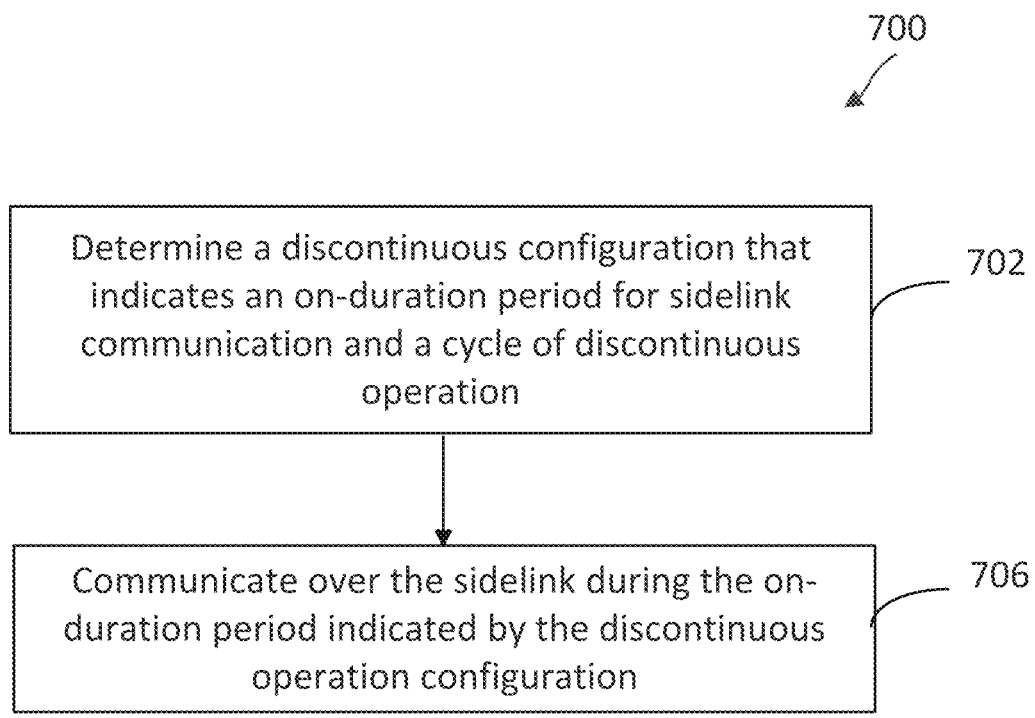

FIG. 7 is a flow diagram of a method 700 according to some aspects of the present disclosure. Steps of the method 700 can be executed by a computing device (e.g., a processor, processing circuit, and/or other suitable component) of a wireless communication device or other suitable means for performing the steps. For example, a wireless communication device, such as the UE 115, 400 may utilize one or more components, such as the processor 402, the memory 404, DTX-DRX configuration module 408, the transceiver 410, the modem 412, and the one or more antennas 416, to execute the steps of method 700. As illustrated, the method 700 includes a number of enumerated steps, but aspects of the method 700 may include additional steps before, after, and in between the enumerated steps. In some aspects, one or more of the enumerated steps may be omitted or performed in a different order.

At step 702, a discontinuous operation configuration is determined. For example, a UE 115 determines the discontinuous operation configuration 300 using the base configuration 200 and one or more of a cycle parameter, an offset parameter, and an on-duration parameter. As discussed above, the discontinuous operation configuration 300 includes the on-duration period 310 for a sidelink communication and a cycle of discontinuous operation.

At step 704, data is communicated during an on-duration period indicated by the sidelink communication. For example, if the discontinuous operation configuration 300 is a DTX configuration, e.g. DTX configuration 300C or 300D, the first UE 115 transmits data over a sidelink to the second UE 115 during the on-duration period 310 of the DTX cycle 325. The DTX cycle 325 is determined from the DTX configuration 300C or 300D. On the other hand, if the discontinuous operation configuration is a DRX configuration, e.g. DRX configuration 300A or 300B, the first UE 115 receives data over a sidelink from the second UE 115 during an on-duration period 310 of the DRX cycle 305. The DRX cycle 305 is determined from the DRX configuration 300A or 300B.

Figure 8:
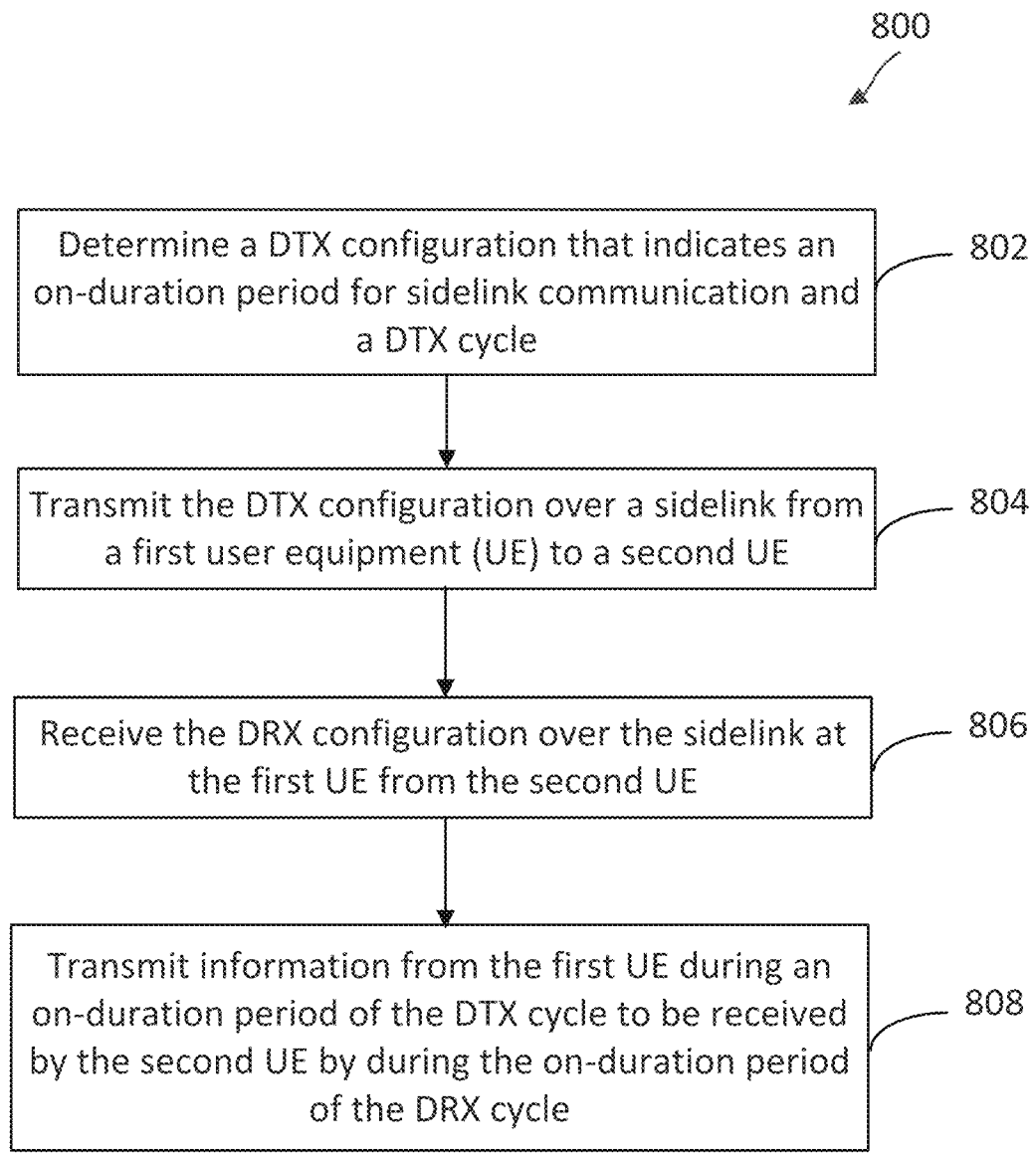
Figure 9:
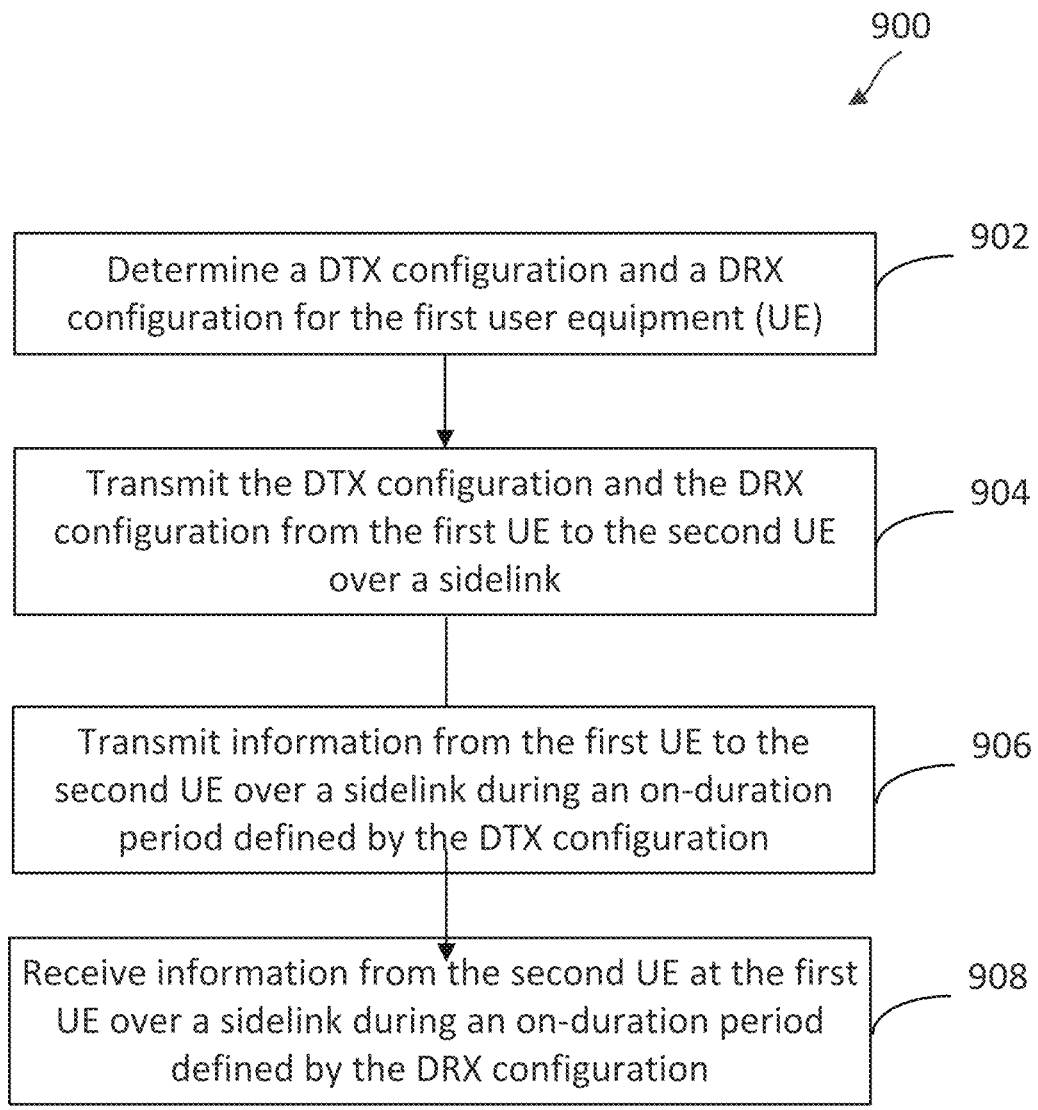

FIG. 8 is a flow diagram of a method 800 according to some aspects of the present disclosure. Steps of the method 800 can be executed by a computing device (e.g., a processor, processing circuit, and/or other suitable component) of a wireless communication device or other suitable means for performing the steps. For example, a wireless communication device, such as the UE 115, 400, may utilize one or more components, such as the processor 402, the memory 404, DTX-DRX configuration module 408, the transceiver 410, the modem 412, and the one or more antennas 416, to execute the steps of method 800. As illustrated, the method 800 includes a number of enumerated steps, but aspects of the method 800 may include additional steps before, after, and in between the enumerated steps. In some aspects, one or more of the enumerated steps may be omitted or performed in a different order.

At step 802, a DTX configuration is determined. For example, UE 115 determines a DTX configuration, e.g. DTX configuration 300C or 300D that indicates the on-duration period 310 and DTX cycle 325 based on the base configuration 200 and one or more parameters. Example parameters may be a cycle parameter, offset parameter, and an on-duration parameter.

At step 804, the DTX configuration is transmitted over a sidelink. For example, the first UE 115 transmits the DTX configuration over the sidelink to one or more other UEs 115. The transmission may be over the sidelink control signaling. Further, the DTX configuration may be included in the SCI or MAC-CE of the sidelink control signaling.

At step 806, the DRX configuration is received over the sidelink. For example, the first UE 115 receives the DRX configuration, e.g. DRX configuration 300A or 300B over the sidelink from a second UE 115. In some instances, the second UE 115 may define the DRX configuration in response to the second UE 115 receiving the DTX configuration from the first UE 115 in step 804. Further the DRX configuration may be determined such that the on-duration period 310 of the DTX configuration determined by the first UE 115 mirrors the on-duration period 310 of the DRX configuration determined by the second UE. In this way, the first UE 115 and the second UE 115 are aligned such that when the first UE 115 is transmitting information the second UE 115 is receiving information.

At step 808, information is transmitted from the first UE to the second UE. For example, the first UE 115 transmits information over a sidelink and during the on-duration period 310 in the DTX cycle 325 determined by the DTX configuration to the second UE 115. As discussed above, the information is received during the on-duration period 310 of the DRX cycle 305 of the second UE 115.

FIG. 900 is a flow diagram of a method 900 according to some aspects of the present disclosure. Steps of the method 900 can be executed by a computing device (e.g., a processor, processing circuit, and/or other suitable component) of a wireless communication device or other suitable means for performing the steps. For example, a wireless communication device, such as the UE 115, 400, may utilize one or more components, such as the processor 402, the memory 404, DTX-DRX configuration module 408, the transceiver 410, the modem 412, and the one or more antennas 416, to execute the steps of method 900. As illustrated, the method 900 includes a number of enumerated steps, but aspects of the method 900 may include additional steps before, after, and in between the enumerated steps. In some aspects, one or more of the enumerated steps may be omitted or performed in a different order.

At step 902, a DTX configuration and an DRX configuration for discontinuous operations are determined. For example, UE 115 determines a DTX configuration that has the on-duration period 310 and the DTX cycle 325 from the base configuration 200 and one or more of a cycle parameter, an offset parameter, and an on-duration period parameter. The UE 115 also determines a DRX configuration that has the on-duration period 310 and the DRX cycle from the one or more of a cycle parameter, an offset parameter, and an on-duration parameter. The cycle parameter, offset parameter, and on-duration parameter used to determine the DTX configuration may be the same or different as the cycle parameter, offset parameter, and on-duration parameter used to determine the DRX configuration. The DTX configuration indicates the on-duration period 310 when the UE 115 transmits information to other UEs 115 over a sidelink and the DRX configuration indicates the on-duration period 310 to other UEs 115 when the first UE 115 receives information over the sidelink.

At step 904, the DTX configuration and the DRX configuration are transmitted over a sidelink to other UEs 115. For example, the first UE 115 transmits the DTX configuration over the sidelink control signaling to one or more other UEs 115. Similarly, the first UE 115 transmits the DRX configuration over the sidelink control signaling to one or more other UEs 115 The sidelink control signaling may include the DTX configuration and the DRX configuration in the SCI or MAC-CE. In this way, the other UEs 115 may determine the on-duration periods 310 when the first UE 115 is transmitting information to other UEs 115 and receiving information from other UEs 115.

At step 906, information is transmitted. For example, the first UE 115 transmits information to other UE(s) 115 during the on-duration period 310 of the DTX cycle 325 indicated by the DTX configuration. The transmission is over a sidelink. Because the first UE 115 transmits the DTX configuration to other UE(s) 115, the other UE(s) 115 may also configure their respective DRX configurations to have the on-duration period 310 in the DRX cycle during which the other UE(s) 115 may receive information.

At step 908, information is received. For example, the first UE 115 receives information from other UE(s) 115 during the on-duration period 310 of the DRX cycle 305 indicated by the DRX configuration. The reception is also over a sidelink. Because the first UE 115 transmitted the DRX configuration to the other UE(s) 115, the other UE(s) 115 may determine when the first UE 115 may receive information during the on-duration period 310 of the DRX cycle. Thus, the other UE(s) 115 may transmit information during the DRX on-duration period 310 of the first UE 115.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. An apparatus, comprising:
a processor configured to:
access, at a first user equipment (UE), a base configuration for determining a discontinuous operation configuration for the first UE; and
determine, by applying at least one parameter to the base configuration, the discontinuous operation configuration that indicates an on-duration period for a sidelink communication and a cycle of discontinuous operation.

2. The apparatus of claim 1, wherein the base configuration includes a discontinuous operation cycle base unit and a plurality of base units in the discontinuous operation cycle base unit.

3. The apparatus of claim 2, wherein the processor is further configured to:
determine the on-duration period in the discontinuous operation configuration using an on-duration parameter in the at least one parameter and at least one base unit in the plurality of base units of the base configuration.

4. The apparatus of claim 2, wherein the processor is further configured to:
determine an offset from a beginning of a cycle to the on-duration period in the discontinuous operation configuration using an offset parameter in the at least one parameter and at least one base unit in the plurality of base units of the base configuration.

5. The apparatus of claim 2, wherein the processor is further configured to:
determine a cycle in the discontinuous operation configuration using a cycle parameter in the at least one parameter and the discontinuous operation cycle base unit of the base configuration.

6. The apparatus of claim 1, wherein the processor is further configured to:
store a look-up table that includes a plurality of discontinuous operation configurations based on the base configuration and at least one of an on-duration parameter, an offset parameter, and a cycle parameter.

7. The apparatus of claim 1, wherein the discontinuous operation configuration is a discontinuous transmission (DTX) configuration that defines a DTX cycle.

8. The apparatus of claim 7, further comprising a transceiver in communication with the processor and configured to transmit data over a sidelink during the on-duration period in the DTX cycle.

9. The apparatus of claim 7, further comprising a transceiver in communication with the processor and configured to:
transmit the DTX configuration to a second UE over a sidelink;
receive a discontinuous reception (DRX) configuration that indicates an on-duration period and a DRX cycle of the second UE, wherein the on-duration period indicated by the DRX configuration is aligned with the on-duration period indicated by the DTX configuration; and
transmit data from the first UE to the second UE over the sidelink during the on-duration period of the DTX cycle to be received by the second UE during the on-duration period of an DRX cycle.

10. The apparatus of claim 1, wherein the discontinuous operation configuration is a discontinuous reception (DRX) configuration that defines a DRX cycle.

11. The apparatus of claim 10, further comprising a transceiver in communication with the processor and configured to receive data over a sidelink during the on-duration period in the DRX cycle.

12. The apparatus of claim 10, further comprising a transceiver in communication with the processor and configured to:
  transmit the DRX configuration to a second UE over a sidelink;
  receive a DTX configuration that indicates an on-duration period and a DTX cycle of the second UE, wherein the on-duration period indicated by the DTX configuration is aligned with the on-duration period indicated by the DRX configuration; and
  receive data from the second UE over the sidelink during the on-duration period of the DRX cycle to be transmitted by the second UE during the on-duration period of a DTX cycle.

13. The apparatus of claim 1, further comprising a transceiver in communication with the processor and configured to transmit the discontinuous operation configuration over a sidelink control signaling.

14. The apparatus of claim 13, wherein the discontinuous operation configuration is transmitted using a sidelink control information (SCI) in the sidelink control signaling.

15. The apparatus of claim 1, wherein the discontinuous operation configuration is transmitted using a MAC control element.

16. A method, comprising:
  accessing, at a first user equipment (UE), a base configuration for determining a discontinuous operation configuration for the first UE; and
  determining, by applying at least one parameter to the base configuration, the discontinuous operation configuration that indicates an on-duration period for a sidelink communication and a cycle of discontinuous operation.

17. The method of claim 16, wherein the base configuration includes a discontinuous operation cycle base unit and a plurality of base units in the discontinuous operation cycle base unit.

18. The method of claim 17, further comprising:
  determining the on-duration period in the discontinuous operation configuration using an on-duration parameter in the at least one parameter and at least one base unit in the plurality of base units of the base configuration.

19. The method of claim 17, further comprising:
  determining an offset from a beginning of a cycle to the on-duration period in the discontinuous operation configuration using an offset parameter in the at least one parameter and at least one base unit in the plurality of base units of the base configuration.

20. The method of claim 17, further comprising:
  determining a cycle in the discontinuous operation configuration using a cycle parameter in the at least one parameter and the discontinuous operation cycle base unit of the base configuration.

21. The method of claim 16, further comprising:
  storing a look-up table that includes a plurality of discontinuous operation configurations based on the base configuration and at least one of an on-duration parameter, an offset parameter, and a cycle parameter.

22. The method of claim 16, wherein the discontinuous operation configuration is a discontinuous transmission (DTX) configuration that defines a DTX cycle.

23. The method of claim 22, further comprising:
  transmitting data over a sidelink during the on-duration period in the DTX cycle.

24. The method of claim 22, further comprising:
  transmitting the DTX configuration to a second UE over a sidelink;
  receiving a discontinuous reception (DRX) configuration that indicates an on-duration period and a DRX cycle of the second UE, wherein the on-duration period indicated by the DRX configuration is aligned with the on-duration period indicated by the DTX configuration; and
  transmitting data from the first UE to the second UE over the sidelink during the on-duration period of the DTX cycle to be received by the second UE during the on-duration period of an DRX cycle.

25. The method of claim 16, wherein the discontinuous operation configuration is a discontinuous reception (DRX) configuration that defines a DRX cycle.

26. The method of claim 25, further comprising:
  receiving data over a sidelink during the on-duration period in the DRX cycle.

27. The method of claim 25, further comprising:
  transmitting the DRX configuration to a second UE over a sidelink;
  receiving a DTX configuration that indicates an on-duration period and a DTX cycle of the second UE, wherein the on-duration period indicated by the DTX configuration is aligned with the on-duration period indicated by the DRX configuration; and
  receiving data from the second UE over the sidelink during the on-duration period of the DRX cycle to be transmitted by the second UE during the on-duration period of a DTX cycle.

28. The method of claim 16, further comprising a transceiver in communication with the processor and configured to transmit the discontinuous operation configuration over a sidelink control signaling.

29. A user equipment (UE), comprising:
  means for accessing a base configuration for determining a discontinuous operation configuration for the first UE; and
  means for determining, by applying at least one parameter to the base configuration, the discontinuous operation configuration that indicates an on-duration period for a sidelink communication and a cycle of discontinuous operation.

30. A non-transitory computer-readable medium having program code recorded thereon, the program code comprising:
  code for accessing, at a first user equipment (UE), a base configuration for determining a discontinuous operation configuration for the first UE; and
  code for determining, by applying at least one parameter to the base configuration, the discontinuous operation configuration that indicates an on-duration period for a sidelink communication and a cycle of discontinuous operation.

* * * * *